Oct. 14, 1952   A. W. EICHSTAEDT   2,614,032
SALT DISSOLVER
Filed March 10, 1950
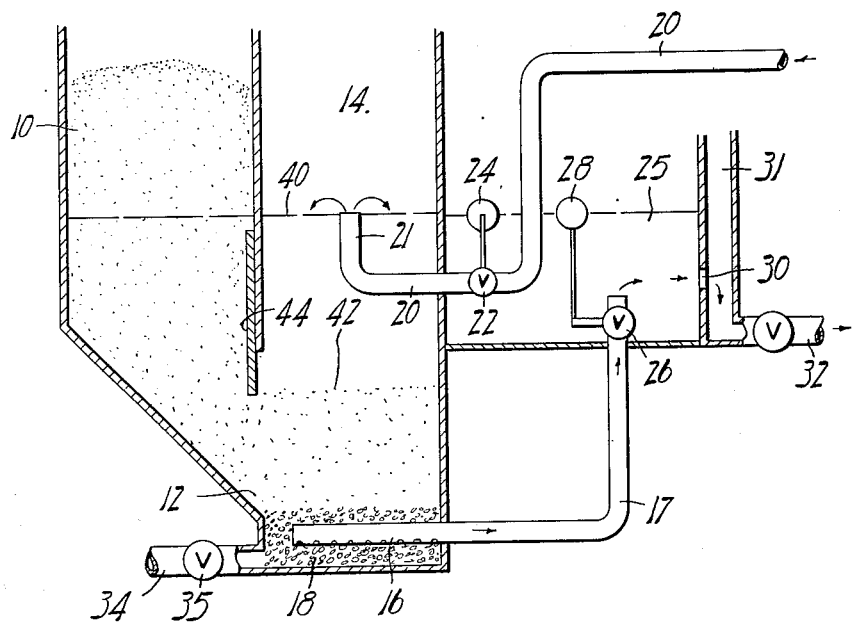
INVENTOR.
Alvin William Eichstaedt
BY
Bean, Brooks, Buckley & Bean
ATTORNEYS Patented Oct. 14, 1952

2,614,032

UNITED STATES PATENT OFFICE 2,614,032

SALT DISSOLVER

Alvin William Eichstaedt, East Aurora, N. Y., assignor to International Salt Company, Inc., Scranton, Pa.

Application March 10, 1950, Serial No. 148,931

5 Claims. (Cl. 23—272)

This invention relates to improvements in salt dissolvers for use in the industries wherein it is required to produce brine from rock or evaporated halite salt of any grade size. Such devices are useful for example in chemical plants, meat packing plants, gravity separators in canneries, and wherever supplies of brine of predetermined strength are needed; and in some cases the used brine is returnable in spent condition for restrengthening at the salt dissolver for recirculation to the point of use.

More specifically, the present invention relates to the type of salt dissolver which employs a bed of granular salt through which water is passed for the purpose of simultaneously taking salt into solution and filtering out any foreign particles such as foreign matters and debris or insoluble salts; such impurities being retained in the salt bed. Industrial salt supplies today may be generally classified either as "rock salt" such as is mechanically mined from underground beds, or "evaporated salt" such as is produced by evaporation of brines found in nature or produced by pumping water through rock salt beds. When rock salt is employed it is usually furnished in the form of granules of approximately equal dimensions in three directions, and such granules when piled in heaps flow freely into a natural angle of repose. Therefore such salts present no particular problem in regard to feeding from the storage section of the dissolving apparatus into the brine producing section thereof. On the other hand, so-called evaporated salt is usually of finer size and at times of flat-shaped crystalline form whereby it tends to lump and crustify in the storage bin or the like, especially whenever it is exposed to dampness but is not actually submerged in water. Also, it has been determined that so-called evaporated salts tend to pack and to provide greater resistance to liquid flow therethrough, and usually include larger proportions of fine salt particles which tend to shift down and plug up the interstices within the salt filter bed. Thus, these two types of salt handle quite differently in apparatii requiring gravity feeding of salt from storage into the dissolving compartment.

Thus, devices of the character aforesaid are subjected to progressive accumulations of debris or impurities or fine salt particles in the filtering bed, whereby the resistance to flow of the solvent liquid therethrough progressively increases, whereby such devices are incapable of automatically maintaining any predetermined rate of brine discharge. Whereas, various salt dissolvers have been previously devised for use in the industries as aforesaid, and have been found to perform with varying degrees of satisfaction; it has been determined that prior type salt dissolvers are defective because they are not adapted to operate successfully upon a variety of types and grades of salt, and because they do not possess ability to automatically maintain predetermined rate of brine discharge in the presence of accumulations of filtered impurities or fine salt particles tending to block the filter bed.

Therefore it is an object of the present invention to provide an improved salt dissolving apparatus of a type which operates with equal facility when employed with rock salt or with evaporated salt.

Another object of the invention is to provide an improved salt dissolver which avoids gravity feed difficulties from the salt storage section into the dissolving section of the apparatus, even when handling evaporated type salt.

It is another object of the present invention to provide an industrial salt dissolving device of the type employing a filter bed, incorporating improved means for automatically compensating for varying brine rate of flow factors interiorly of the device, so as to automatically maintain a predetermined rate of brine discharge without operator attention.

Another object of the invention is to provide a salt dissolver of the character aforesaid which provides improved performances as aforesaid in combination with structural and mechanical simplicity.

Other objects of the present invention will appear from the specification hereinafter.

In the drawing:

Fig. 1 is a schematic side elevational view of a salt dissolver of the invention.

The invention as illustrated in the drawing as being incorporated in an industrial salt dissolver including a salt storage chamber 10 into which crystalline salt may be fed or dumped periodically in order to maintain therein a suitable supply of salt to be processed. The bin 10 is apertured adjacent its bottom end as indicated at 12 to permit the salt to feed from the storage bin into the lower portion of a salt dissolving chamber 14 which may be conveniently arranged as illustrated to stand adjacent the storage bin 10. A brine collecting intake as indicated at 16 is positioned in the bottom portion of the dissolving chamber 14, and may of course comprise any desired type device such as a perforated pipe or screen so as to receive and deliver brine to a delivery pipe 17 while retarding passage of solid particles thereinto. In some cases it may be preferred to bury the intake 16 within a bed of gravel or the like as indicated at 18.

An inlet conduit 20 is arranged to deliver feed water or a weak brine requiring to be restrengthened, as the case may be, into the dissolving chamber 14 at an elevation above the level of salt in the bottom portion of the dissolving chamber; the discharge end of the feed conduit 20 being either upwardly turned as indicated at 21 to provide a fountain effect, or otherwise arranged in any desired manner so as to uniformly disperse the feed liquid over the top of the salt bed in the dissolving chamber. The feed conduit 20 is equipped with a regulating valve 22 which is controlled by a float 24 which moves with the level of liquid in a brine regulating chamber designated 25 into which the brine discharging through the conduit 17 is let under control of a valve 26. The valve 26 is in turn controlled by a float 28 also disposed to be operated by rise and fall of the liquid within the chamber 25, as will be explained more fully hereinafter. A wall portion of the chamber 25 is fitted with an accurately sized orifice 30 which is selected to permit flow of brine therethrough into a collector box 31 and thence out through the brine delivery conduit 32 at the desired rate of flow. A cleanout pipe is provided such as is indicated at 34, and is arranged to be controlled by a valve 35 for periodic cleaning of the filter bed portion of the device, as is well understood in the art.

Water, or weak brine which needs restrengthening, as the case may be, is let into the feed conduit 20 so as to fill both the dissolving chamber and the storage chamber with liquid up to a level such as is indicated at 40. Thus, the lower portion of the salt in the reservoir 10 will be under liquid, as well as the salt which has poured from the chamber 10 into the dissolving chamber 14. Incidentally, it has been determined that when granular salt is submerged it flows much more readily than when in dry condition, and practically levels off when flowing through the aperture 12 in the case of the present apparatus as to the elevation indicated at 42. Thus, feed liquid emerging from the nozzle 21 is delivered into the upper portion of the dissolving chamber and flows downwardly through the salt bed in the lower end thereof, thereby at the same time being mechanically filtered and taking salt into solution so as to provide the desired strength brine by the time it enters the intake 16 and flows into the brine regulating chamber 25. The static liquid pressure head within the dissolving chamber 14 tends to force brine through the pipe 17 into the brine chamber 25 so as to seek approximately the same level as the liquid in the dissolving chamber as indicated at 40, and thus the brine within the chamber 25 will be forced to flow through the orifice 30 at a rate which is a function of the orifice size and the static head above the orifice level. As stated hereinabove, the orifice is preselected as to size so as to permit the desired rate of brine flow under the condition just described. The float 24 and the valve 22 are so arranged that if the brine in the chamber 25 tends to exceed the level which will produce the desired rate of brine discharge through the orifice 30, the float 24 will rise to throttle the valve 22, thus reducing the rate of inlet flow to the chamber 14; thereby maintaining a constant brine discharge rate.

However, as the filtering salt bed in the lower portion of the dissolving chamber becomes progressively choked with debris or other impurities or with fine salt particles, the resistance to brine flow therethrough increases, and the flow of brine through the pipe 17 into the chamber 25 will be thereby reduced, and thus the level of brine in the chamber 25 will tend to lower. But, any lowering of the brine level in the chamber 25 will immediately effect a corresponding movement of the float 24 which will thereby regulate the valve 22 so as to permit a greater rate of flow of water through the incoming pipe 20. Thus, the liquid level within the dissolving chamber 14 rises, and thereby provides an increased pressure head against the filter bed; whereby the apparatus automatically operates to maintain the brine level within the chamber 25 at a uniform elevation so that the orifice 30 will continue to discharge brine at the desired uniform rate of flow. Thus, it is a particular feature of the apparatus of the invention that in spite of accumulations of brine flow clogging materials in the filter bed, the apparatus will operate automatically at all times to maintain a predetermined rate of brine discharge without operator-attention.

As indicated at 44, a gate device may be adjustably mounted against a wall portion of the salt storage chamber 10, so as to be readily adjustable to various positions to regulate the size of the aperture 12 as well as the level 42 to which the salt will flow into the dissolving chamber 14 when it moves from the storage chamber 10. Differently sized salts provide different total surface areas per unit volume, and therefore require different depths of beds to provide the same degree of saturation of the liquid passing through the bed. Thus, proper adjustment of the gate 44 will suit the apparatus of the invention to differently sized salts. For example, a finely sized grade of salt will require a thinner bed to procure a desired degree of saturation than when working with a coarser sized salt; and thus it will be appreciated that the adjustable aperture arrangement further contributes to provide the apparatus of the invention to be adaptable with equal facility to various types and grades of salts.

Provision of the brine outlet chamber 31 in communication with the orifice 30 avoids application of back pressure at the orifice 30 such as might otherwise develop from the delivery conduit 32 during normal operation of the unit. This is accomplished by making certain that the orifice 30 is at sufficient elevation above the bottom of the chamber 31 and the level of the conduit 32 so that the brine flows freely into the chamber 31 between the level of the conduit 32 and the level of the orifice 30 to thereupon provide sufficient head to overcome the line resistance in the conduit 32. Thus, the orifice 30 operates as explained hereinabove without interference by the line resistance within the conduit 32.

The valve and float devices 26—28 are so arranged as to close the valve 26 to shut off flow of brine through the conduit 17 whenever the level of the brine in the chamber 25 rises appreciably above the operating level thereof as indicated in the drawing. Thus, for example, whenever the unit is shut down for servicing purposes or in connection with an intermittent type operation, the valve controlling flow through the conduit 32 will be closed by the operator. The level of liquid within the dissolving chamber 14 then tends to rise above the normal operating level because of continued flow of feed water, which is immediately reflected in a rise of the brine within the chamber 25. This causes the float 24 to close the inlet valve 22. If, because of previous partial clogging of the filter bed as explained hereinabove the operating level of liquid within the dissolving chamber 14 is substantially higher than the brine level in the chamber 25, any tendency of the liquids within the chambers 14 and 25 to seek a common level will be immediately prevented by a tendency of the brine level in the chamber 25 to rise which operates the float 28 so as to close the valve 26. Thus, the device operates automatically to hold the proper liquid levels in the brine chamber and in the dissolving chamber 14, so that immediately upon reopening of the valve controlling brine outlet through the conduit 32, the apparatus is in operating condition and the process continues as though it had not been disturbed.

Thus, it will be appreciated that the apparatus of the invention embodies numerous features and devices which operate automatically to adapt the device to various types and grades of salt, and which render the device automatically operable to maintain a predetermined rate of brine discharge even in the face of progressive accumulations of filter-clogging materials without operator attention. It will of course be appreciated that only one form of the invention has been illustrated and described in detail herein, and that various changes may be made therein without departing from the spirit of the invention or the scope of the appended claims. For example, the storage bin 10 and the dissolving chamber 14 may be of any desired shapes or styles and may be contiguously arranged as shown, or separated and joined by a conduit. Or, additional bins similar to bin 10 of the drawing may be arranged at different sides of the dissolving chamber; or, a large single storage bin may be arranged to encircle a centrally disposed dissolving chamber, as may be preferred.

I claim:

1. A salt dissolver comprising in combination, a bin for salt to be dissolved, a dissolving chamber in open communication with the lower portion of said bin, a brine reservoir, a brine outlet device in a lower portion of said chamber for discharge of brine therefrom to said reservoir, a salt solvent inlet device arranged to discharge solvent into said chamber, valve means regulating flow of solvent through said inlet device and a first control float positionally controlled by level of liquid in said reservoir and connected to said valve means for actuation thereof, a discharge opening in one wall of said reservoir of such size so as to be responsive to the liquid pressure head therein to discharge liquid therefrom at a constant rate under constant head conditions in said reservoir, and means receiving the output from said discharge device for conveying the liquid to a point of use while avoiding imposition of back pressure against said discharge opening, a valve regulating flow of brine into said reservoir, and a second control float connected to and controlling said valve in response to changes in the level of brine in said reservoir to maintain the liquid pressure head constant.

2. A salt dissolver comprising in combination, a dissolving chamber, means for feeding salt to be dissolved to said chamber, a brine reservoir, a brine outlet device in a lower portion of said chamber for discharge of brine therefrom to said reservoir, a salt solvent inlet device arranged to discharge solvent into said chamber, valve means regulating flow of solvent through said inlet device and a first control float positionally controlled by level of liquid in said reservoir and connected to said valve means for actuation thereof, a discharge opening in one wall of said reservoir of such size so as to be responsive to the liquid pressure head therein to discharge liquid therefrom at a constant rate under constant head conditions in said reservoir, and means receiving the output from said discharge device for conveying the liquid to a point of use while avoiding imposition of back pressure against said discharge opening, a valve regulating flow of brine into said reservoir, and a second control float connected to and controlling said valve in response to changes in the level of brine in said reservoir to maintain the liquid pressure head constant.

3. A salt dissolver comprising in combination, a bin for salt to be dissolved and a dissolving chamber contiguous said bin and having a wall portion in common therewith, an aperture through said wall portion in open communication with the lower portion of said dissolving chamber, a shutter mounted upon said wall for adjustment to regulate the size of and the elevation of the top edge of said aperture, a brine reservoir, a brine outlet device in a lower portion of said chamber for discharge of brine therefrom to said reservoir, a salt solvent inlet device arranged to discharge solvent into said chamber, valve means regulating flow of solvent through said inlet device and a first control float positionally controlled by level of liquid in said reservoir and connected to said valve means for actuation thereof, a discharge opening in one wall of said reservoir of such size so as to be responsive to the liquid pressure head therein to discharge liquid therefrom at a constant rate under constant head conditions in said reservoir, a valve regulating flow of brine into said reservoir, and a second control float connected to and controlling said valve in response to changes in the level of brine in said reservoir to maintain the liquid pressure head constant.

4. A salt dissolver comprising in combination, a dissolving chamber, means for feeding salt to be dissolved to said chamber, a brine reservoir, a brine outlet device in a lower portion of said chamber for discharge of brine therefrom to said reservoir, a salt solvent inlet device arranged to discharge solvent into said chamber a first valve means regulating flow of solvent through said inlet device, a first float controlled by level of liquid in said reservoir and connected for actuation of said first valve means, a discharge opening in one wall of said reservoir of such size so as to be responsive to the liquid pressure head therein to discharge liquid therefrom at a constant rate under constant head conditions in said reservoir, and means receiving the output from said discharge opening for conveying the liquid to a point of use, a second valve regulating flow of brine into said reservoir, and second float means connected to and controlling said second valve in response to changes in the level of brine in said reservoir to maintain the liquid pressure head constant.

5. A salt dissolver comprising in combination, a dissolving chamber, means for feeding salt to be dissolved to said chamber, a brine reservoir, a brine outlet device in a lower portion of said chamber for discharge of brine therefrom to said reservoir, a salt solvent inlet device arranged to discharge solvent into said chamber, first valve means regulating flow of solvent through said inlet device and a first control float positionally controlled by level of liquid in said reservoir and connected to said valve means for actuation thereof, a discharge orifice in one wall of said reservoir at an elevation below the normal operating level of liquid within said chamber, and means receiving the output from said discharge orifice for conveying the liquid to a point of use, a second valve regulating flow of brine into said reservoir, and a second control float connected to and controlling said second valve in response to changes in the level of brine in said reservoir to maintain the normal operating level of liquid constant.

ALVIN WILLIAM EICHSTAEDT.

REFERENCES CITED

The following references are of record in the file of this patent:

UNITED STATES PATENTS

| Number | Name | Date |
|---|---|---|
| 380,378 | Wiser | Apr. 3, 1888 |
| 2,072,385 | Schwartz | Mar. 2, 1932 |
| 2,173,986 | Stuart | Sept. 26, 1939 |
| 2,270,372 | Hunter | Jan. 20, 1942 |
| 2,402,636 | Kaufmann | June 25, 1946 |
| 2,412,560 | Bolton | Dec. 17, 1946 |